United States Patent Office 3,335,012
Patented Aug. 8, 1967

3,335,012
FRUIT JUICE CLARIFICATION COMPOSITION
AND PROCESS FOR ITS USE
Edward Graham Bassett and Robert Lemoyne Charles, Elkhart, Ind., assignors to Miles Laboratories, Inc., Elkhart, Ind., a corporation of Indiana
No Drawing. Filed Jan. 2, 1964, Ser. No. 335,431
13 Claims. (Cl. 99—106)

ABSTRACT OF THE DISCLOSURE

The fruit juice clarification activity of pectinase can be improved by the addition of at least 50 parts per million by weight based on weight of pectinase of clupeine, salmine, sturine, poly-L-lysine or a basic, non-enzymatic protein-like factor derived from pectinase.

This invention relates to the clarification of fruit substances. More particularly, it relates to novel mixtures of pectinase and added materials useful for clarifying fruit substances, to the use of said mixtures and to preparation of said added material.

Fruit substances, such as fruit juices, wine, jellies and the like, are desirably clear and sparkling for maximum consumer acceptance. It is well known that such fruit substances can be clarified to remove suspended colloidal pectic materials by adding pectolytic enzymes to such fruit substances and allowing the resulting mixture to stand until the suspended material is flocculated. Decantation or filtration results in a clarified liquid. However, in order to achieve the desired degree of clarification, repeated filtrations are often necessary. Even after repeated processing with pectinase and filtration the fruit substances are sometimes found to remain somewhat cloudy.

It is an object of the present invention to provide a material which improves clarification of fruit substances.

It is another object of the present invention to provide an improved process for clarification of fruit substances.

It is still another object of the present invention to provide a process for preparation of material which improves clarification of fruit substances.

The pectinase used for clarification of fruit substances is a well-known material and consists essentially of a mixture of pectinesterase and polygalacturonase. As used herein, the term "pectinase" refers to such commercially available enzyme mixture. "Takamine Pectinase GM" marketed by the Miles Chemical Co. is an example of such commercial material.

In accordance with the present invention, a composition useful for improved clarification of fruit substances consists essentially of a mixture of pectinase and at least about 50 parts per million by weight based on weight of pectinase of a material selected from the class consisting of clupeine, salmine, sturine, poly-L-lysine and a basic, non-enzymatic protein-like factor derived from pectinase, said factor having the properties of electrophoretic mobility of about $1.09 \times 10^{-5}$ cm.$^2$ per volt/second at pH 9.4, molecular weight between about 30,000 and about 60,000, ultra-violet absorption spectrum having typical protein peak at 277 mu and very strong absorption below 230 mu, and visible absorption spectrum having a main peak at 310 mu with smaller peaks at 320 mu and 325 mu. Preferably the composition contains from about 50 to about 150 parts per million by weight of the added material based on weight of the pectinase. At least 50 parts per million by weight of the added material must be present before there is noticeable improvement in pectinase clarification activity. When more than about 150 parts per million by weight of the added material are employed, the clarification takes place rapidly, but generally there is no particular advantage to using the added material in amounts over 150 parts per million by weight.

The clupeine, salmine and sturine materials useful in the present invention are protamines and are known to be available from fish. These protamines are technically different from protein albumins previously employed for clarification of beverages. The protamines are not coagulated by heat while albumins are readily coagulated by heat. Poly-L-lysine is an amino acid and is known to be commercially available.

The basic, non-enzymatic protein-like factor derived from pectinase which is useful in the present invention can be obtained in several ways. An aqueous solution of pectinase can be mixed with ammonium sulfate, in an amount of from about 25 to about 65 percent of the amount required for saturation of the solution with ammonium sulfate, to form a precipitate of the desired factor. The precipitate is then separated from the supernatant liquid. This factor can be added in the required amounts to pectinase in accordance with the present invention in a solid form or in a liquid form. The liquid form is prepared by dissolving the solid factor in water. Any enzymatic activity in the factor is preferably eliminated prior to its use in the present invention. Removal of enzymatic activity is accomplished by boiling the raw material pectinase solution for about 10–30 minutes prior to precipitation of the factor or by boiling an aqueous solution of the factor for a similar period of time. If desired, solid factor free of enzyme activity can then be obtained from this solution by evaporation of liquid.

The preferred method of obtaining the factor derived from pectinase comprises boiling an aqueous solution of pectinase for a time sufficient to destroy the enzymatic activity of said solution, cooling the solution to about room temperature, removing insoluble matter from the solution (such as by filtration or centrifugation), exhaustively dialyzing the solution against water to form a gelatinous precipitate, extracting the desired factor from the precipitate with an aqueous alkaline medium containing at least 0.05 M of an alkaline buffer, adding a non-aqueous polar solvent to the resulting extractant solution in an amount of about 65 volume percent concentration to form a precipitate, separating the precipitate from the supernatant solution, adding a non-aqueous polar solvent to said supernatant solution in an amount of about 80 volume percent concentration to form a precipitate of the desired factor product, and then recovering the solidified product. The above mentioned dialysis procedure is conveniently carried out against running tap water for 48 hours followed by dialysis against running distilled water for 24 hours.

Illustrative examples of alkaline buffers useful in the above process are sodium carbonate, sodium citrate-citric acid and the like. The preferred extractant is 0.2–0.6 M sodium carbonate. Illustrative examples of non-aqueous polar solvents are ethanol, methanol, acetone and the like. Ethanol is the preferred non-aqueous polar solvent.

With the exception of process steps involving boiling of solutions, all the above described process steps are conveniently carried out at normal room temperatures.

The factor derived from pectinase by the above described techniques can be characterized as a basic, i.e., alkaline, protein-like material. When subjected to electrophoresis at a pH of 9.4 in a buffer solution containing 0.3 M glycine and 0.1 M sodium hydroxide, it has an electrophoretic mobility of about $1.09 \times 10^{-5}$ cm.$^2$ per volt per second. Ultracentrifugation shows a sedimentation constant of 2.2 s. which indicates a molecular weight of from about 30,000 to about 60,000. Absorption spectrophotometry of aqueous solutions of the factor result in an ultra-violet absorption spectrum having typical protein peak at 277 mu and very strong absorption below 230 mu, and a visible absorption spectrum having a main peak at 310 mu with smaller peaks at 320 mu and 325 mu. The "mu" is a unit of wavelength measurement normally employed in spectrophotometry and is equal to 10 Angstrom units.

When the above factor derived from pectinase is mixed with pectinase according to the present invention to provide compositions having improved clarification results for fruit substances, such added amounts of the factor are intended to be in excess of any amounts of the same factor normally present in commercially available pectinase. Such commercially available pectinase normally contains about 150–170 parts per million by weight of the above described factor.

The above described novel composition containing pectinase and added material can be employed to achieve improved clarification results for fruit substances and especially for fruit juices, such as apple juice. This novel composition can be added to the fruit substance in several ways. It can be added directly to the fruit, to the free-run fruit juice after processing the fruit, or, in the case of wine, during or after fermentation. The mixture of fruit substance and novel composition is allowed to stand until the suspended colloidal pectic materials in the fruit substance have flocculated and then the resulting floc is separated from the so-clarified fruit substance. When the novel composition is added directly to the fruit, the juice resulting from the so-treated fruit is clarified as formed or is clarified after standing and allowing flocculated impurities to rapidly settle.

The flocculation time or the time required to form a floc of the pectic colloidal impurities is generally only a few minutes, but several hours standing time is required for the floc to completely settle in a large vat containing a relatively large quantity of fruit juice, for example. The present invention has the advantages of shortening the time for flocculation and also for settling and for providing more complete clarification for a given clarification time than prior art techniques.

The invention is described further in the following illustrative examples.

Example 1

An aqueous solution (250 ml.) of commercially available pectinase containing 10 weight percent pectinase (25 g.) was fractionally precipitated with ammonium sulfate. Solid ammonium sulfate was added until the solution contained 65 percent of the saturation amount (107.5 g.). A heavy precipitate formed. After standing for 20 minutes at room temperature, the precipitate was separated from the solution by centrifugation at 1000 r.p.m. and dissolved in water at room temperature. The resulting solution was found to contain only a small part of the original pectinase activity. This solution was then heated to boiling to destroy all traces of enzyme activity and was designated as *non-enzyme factor*. To the 280 ml. of ammonium sulfate-containing solution remaining from this precipitation, an additional 30 g. of solid ammonium sulfate were added to 80 percent of saturation. After standing for one hour at room temperature, a second precipitate which formed was separated by centrifugation at 1000 r.p.m. and redissolved in water at room temperature. The resulting solution was found to contain most of the pectinase activity present in the starting solution. This solution was designated as *factor-free pectinase*. The strength of the solutions of non-enzyme factor and factor-free pectinase were such that a mixture of 1 ml. of each is equivalent in properties to 1 ml. of original pectinase solution. The original pectinase contained about 170 parts per million by weight non-enzyme factor. Various mixtures of factor-free pectinase and non-enzyme factor were prepared and tested for clarification ability on 50 ml. samples of apple juice at 50° C. The time to produce substantially complete flocculation (measured from time of addition of mixture to apple juice) was used as indication of clarification ability. The results are shown in the following table.

TABLE I

| | Run | | |
|---|---|---|---|
| | 1 | 2 | 3 |
| Factor-free pectinase, ml | 1 | 1 | 1 |
| Non-enzyme factor, ml | 1 | 2 | 3 |
| Flocculation time, min | 11 | 9 | 5 |

It can be seen from the above data that when the non-enzyme factor is added to pectinase, the flocculation time substantially decreases. Run 1 simulates action of commercial pectinase. Run 2 shows action of 1 ml. additional factor (an added 150–170 parts per million by weight). Run 3 shows an added 300–340 parts per million by weight of factor.

Example 2

An aqueous solution (250 ml.) of commercially available pectinase containing 5 weight percent pectinase (12.5 g.) was heated to about 100° C. for 15–30 minutes. The hot solution was then cooled to room temperature and subjected to centrifugation to remove insolubles. The resulting clear dark brown supernatant liquid was decanted and then subjected to dialysis against running tap water for 48 hours followed by dialysis against running distilled water for 24 hours. A black-brown gelatinous precipitate was removed from the dialysis apparatus. This difficultly soluble mass was extracted with aqueous 0.4 M sodium carbonate solution. The extractant liquid was then treated with 2 volumes of ethanol for each volume of extractant (about 65 volume percent concentration). The resulting precipitate was removed by centrifugation. The supernatant liquid was decanted and ethanol was added to a final concentration of about 80 volume percent to form the final solidified factor product. This non-enzyme factor product was characterized as a basic protein-like material. Electrophoresis at pH 9.4 in a buffer solution containing 0.3 M glycine and 0.1 M sodium hydroxide showed that the main component had a mobility of $1.09 \times 10^{-5}$ cm.$^2$ per volt per second. Ultracentrifugation showed a sedimentation constant of 2.2 s. which indicated a molecular weight of from about 30,000 to about 60,000. Spectrophotometric analysis indicated an ultra-violet absorption spectrum having typical protein peak at 277 mu and very strong absorption below 230 mu, and a visible absorption spectrum having a main peak at 310 mu with smaller peaks at 320 mu and 325 mu. A mixture of 1 mg. of the above prepared non-enzyme factor and 5 mg. of pectinase (about 200,000 p.p.m. factor based on weight of pectinase) was added to 50 ml. apple juice at 50° C. The juice was clarified in 1.5 minutes which was an improvement over use of pectinase alone to clarify the apple juice.

Example 3

The effect of concentration of the added material to pectinase upon flocculation time was further studied. Various amounts of salmine were added to pectinase and the resulting mixtures were separately added to separate portions of apple juice in an amount of 0.008 weight/volume percent at 50° C. Various types of apple juice were also tested. The results are shown in the following table.

TABLE II

| Added Salmine, p.p.m. | Flocculation time, min. | | |
|---|---|---|---|
| | N.J. Juice | California Juice | Virginia Juice |
| 0 | 2.25 | 4.00 | 4.50 |
| 50 | 2.25 | 3.75 | 4.00 |
| 60 | 1.50 | 3.50 | 3.50 |
| 70 | 1.25 | 3.25 | 3.00 |
| 80 | 1.00 | 3.00 | 3.00 |
| 90 | 1.00 | 2.75 | 2.50 |
| 100 | 1.00 | 2.25 | 2.00 |
| 110 | 0.75 | 2.00 | 2.00 |
| 120 | 0.75 | 1.50 | 1.50 |
| 130 | 0.75 | 1.00 | 1.00 |

While the flocculation times varied with the different sources of apple juice, it is evident that salmine addition to pectinase in amounts of from about 50 p.p.m. to about 150 p.p.m. substantially reduced flocculation time.

While the above examples described use of non-enzyme factor and salmine for addition to pectinase for clarification of apple juice, it should be understood that the invention is not so limited. Other additives, such as clupeine, sturine and poly-L-lysine, can also be employed on apple juice as well as other fruit substances, such as jellies, grape juice and wine. This is shown by the following examples.

*Example 4*

A mixture of 5 mg. of pectinase and 4 mg. of clupeine (800,000 p.p.m. clupeine based on weight of pectinase) was added to 50 ml. apple juice at 50° C. The juice was clarified in 2.5 minutes which was an improvement over use of pectinase alone to clarify the apple juice.

*Example 5*

A mixture of 5 mg. of pectinase and 2 mg. of poly-L-lysine (400,000 p.p.m. poly-L-lysine based on weight of pectinase) was added to 50 ml. apple juice at 50° C. The juice was clarified in the improved time of 2.5 minutes. When the poly-L-lysine content was increased to 4 mg. (800,000 p.p.m.), the clarification time was still further decreased to 0.3 minute.

In summary, the present invention relates to an improved pectinase-added material composition that is capable of improved clarification of fruit substances and especially fruit juices. The invention also relates to an improved technique for producing one of the added materials and to an improved process of fruit substance clarification.

What is claimed is:

1. A composition useful for clarification of fruit juices which consists essentially of a mixture of pectinase and at least about 50 parts per million by weight based on weight of pectinase of a material selected from the class consisting of clupeine, salmine, sturine, and poly-L-lysine.

2. A composition as claimed in claim 1 wherein the material mixed with the pectinase is present in an amount of from about 50 to about 150 parts per million by weight based on weight of the pectinase.

3. A composition as claimed in claim 1 wherein the material mixed with the pectinase is clupeine.

4. A composition as claimed in claim 1 wherein the material mixed with the pectinase is salmine.

5. A composition as claimed in claim 1 wherein the material mixed with the pectinase is sturine.

6. A composition as claimed in claim 1 wherein the material mixed with the pectinase is poly-L-lysine.

7. A process for clarifying a fruit juice containing suspended colloidal pectic materials which comprises adding to said fruit juice a mixture of pectinase and at least about 50 parts per million by weight based on weight of pectinase of a material selected from the class consisting of clupeine, salmine, sturine, and poly-L-lysine, allowing the fruit juice and added mixture to stand until said colloidal pectic materials have flocculated, and separating the resulting floc from the so-clarified fruit juice.

8. A process as claimed in claim 7 wherein the fruit juice is apple juice.

9. A process as claimed in claim 7 wherein the material mixed with the pectinase is present in an amount of from about 50 to about 150 parts per million by weight based on weight of the pectinase.

10. A process as claimed in claim 7 wherein the material mixed with the pectinase is clupeine.

11. A process as claimed in claim 7 wherein the material mixed with the pectinase is salmine.

12. A process as claimed in claim 7 wherein the materila mixed with the pectinase is sturine.

13. A process as claimed in claim 7 wherein the material mixed with the pectinase is poly-L-lysine.

No references cited.

A. LOUIS MONACELL, *Primary Examiner.*

M. VOET, *Examiner.*